US011375377B2

(12) United States Patent
Xu et al.

(10) Patent No.: US 11,375,377 B2
(45) Date of Patent: Jun. 28, 2022

(54) FALSE BASE STATION DETECTION

(71) Applicant: QUALCOMM Incorporated, San Diego, CA (US)

(72) Inventors: Huilin Xu, San Diego, CA (US); Gavin Bernard Horn, La Jolla, CA (US); Ravi Agarwal, San Diego, CA (US); Soo Bum Lee, San Diego, CA (US); Ozcan Ozturk, San Diego, CA (US); Naga Bhushan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 6 days.

(21) Appl. No.: 17/015,922

(22) Filed: Sep. 9, 2020

(65) Prior Publication Data

US 2021/0084498 A1 Mar. 18, 2021

Related U.S. Application Data

(60) Provisional application No. 62/901,129, filed on Sep. 16, 2019.

(51) Int. Cl.
*H04W 48/12* (2009.01)
*H04W 12/122* (2021.01)
(52) U.S. Cl.
CPC ......... *H04W 12/122* (2021.01); *H04W 48/12* (2013.01)

(58) Field of Classification Search
CPC ........................... H04W 12/122; H04W 12/12
See application file for complete search history.

(56) References Cited

U.S. PATENT DOCUMENTS

2016/0309332 A1 10/2016 Norrman et al.
2016/0381545 A1* 12/2016 Wang .................. H04W 12/128
455/434
2021/0385800 A1* 12/2021 Harada ............... H04W 72/042

FOREIGN PATENT DOCUMENTS

EP 2003818 A1 12/2008
EP 2661113 A1 11/2013

OTHER PUBLICATIONS

International Search Report and Written Opinion—PCT/US2020/050167—ISA/EPO—dated Jan. 20, 2021.
Partial International Search Report—PCT/US2020/050167—ISA/EPO—dated Nov. 19, 2020.

* cited by examiner

*Primary Examiner* — Michael T Vu
(74) *Attorney, Agent, or Firm* — Patterson & Sheridan, L.L.P.

(57) ABSTRACT

Certain aspects of the present disclosure provide techniques for detecting false base stations and transmissions therefrom.

26 Claims, 17 Drawing Sheets

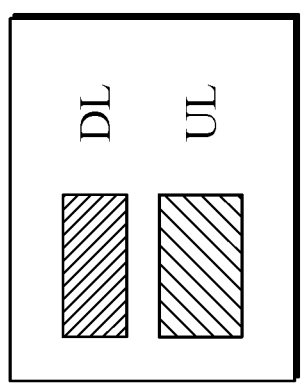
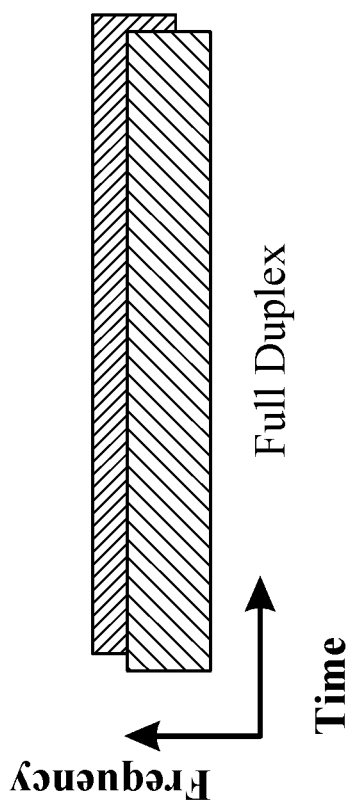
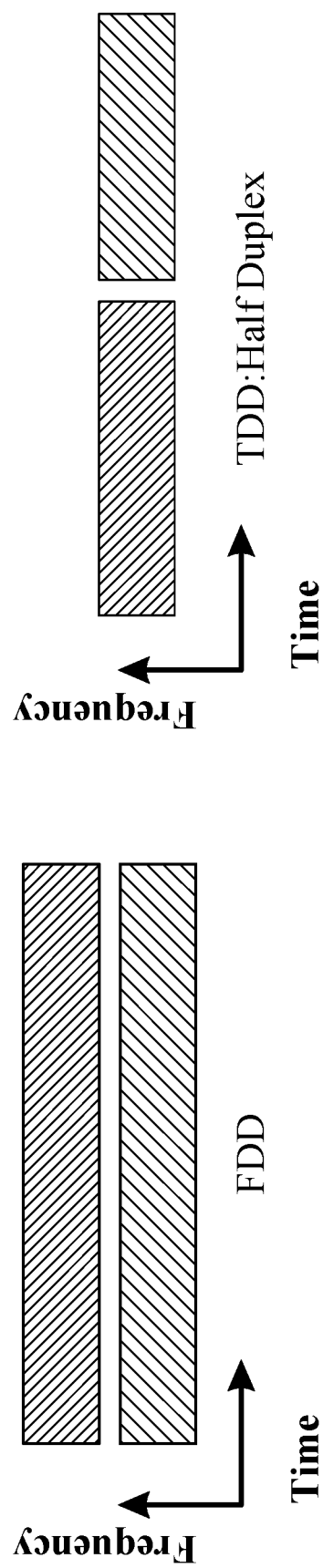
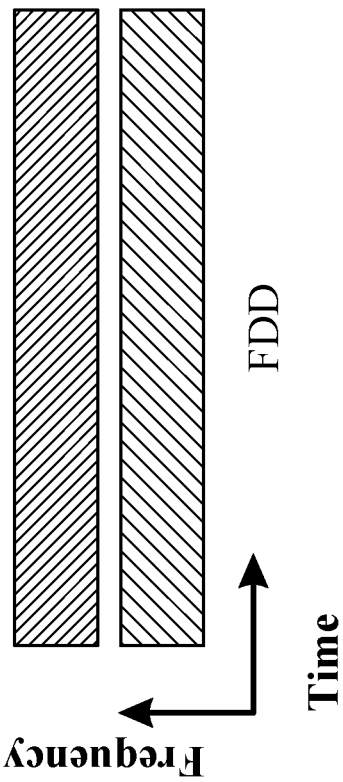
FIG. 7A
FIG. 7B
FIG. 7C

FALSE BASE STATION DETECTION

CROSS-REFERENCE TO RELATED APPLICATION(S)

This application claims benefit of and priority to U.S. Provisional Application No. 62/901,129, filed Sep. 16, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, false base station detection.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is referred to as new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a node. The method generally includes receiving a downlink transmission from a first base station; comparing the downlink transmission from the first base station to at least one reference downlink transmission; and determining, based on the comparison, whether the downlink transmission from the first base station has been altered from the reference downlink transmission.

Certain aspects of the present disclosure provide a method for wireless communication that may be performed by a network entity. The method generally includes receiving an indication from a first node that the first node has determined that a downlink transmission from a first base station has been altered from a reference downlink transmission; and taking action based on the received indication.

Certain aspects of the present disclosure provide a method for wireless communications by a node. The method generally includes determining a configuration for generating feedback information for detection of imposter base stations in a network; receiving signals transmitted from at least a first base station; generating the feedback information based on the received signals; and transmitting the feedback information to a network entity to detect if the first base station is an imposter base station.

Certain aspects of the present disclosure provide a method for wireless communication that may be performed by a network entity. The method generally includes receiving feedback information from a node, the feedback information generated based on received signals transmitted from at least a first base station; and processing the feedback information to detect if the first base station is an imposter base station.

Certain aspects of the present disclosure provide an apparatus for wireless communications. The apparatus generally includes at least one processor configured to: receive a downlink transmission from a first base station; compare the downlink transmission from the first base station to at least one reference downlink transmission; and determine, based on the comparison, whether the downlink transmission from the first base station has been altered from the reference downlink transmission. The apparatus generally includes a memory coupled with the at least one processor.

Certain aspects of the present disclosure provide an apparatus for wireless communication that may be performed by a network entity. The apparatus generally includes at least one processor configured to: receive an indication from a first node that the first node has determined that a downlink transmission from a first base station has been altered from a reference downlink transmission; and take action based on the received indication. The apparatus generally includes a memory coupled with the at least one processor.

Certain aspects of the present disclosure provide an apparatus for wireless communications. The apparatus generally includes at least one processor configured to: determine a configuration for generating feedback information for detection of imposter base stations in a network; receive signals transmitted from at least a first base station; generate the feedback information based on the received signals; and transmit the feedback information to a network entity to detect if the first base station is an imposter base station. The apparatus generally includes a memory coupled with the at least one processor.

Certain aspects of the present disclosure provide an apparatus for wireless communication. The apparatus generally includes at least one processor configured to: receive feedback information from a node, the feedback information is generated based on received signals transmitted from at least a first base station; and process the feedback information to detect if the first base station is an imposter base station. The apparatus generally includes a memory coupled with the at least one processor.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 7A-7C illustrate uplink and downlink transmissions by a BS, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
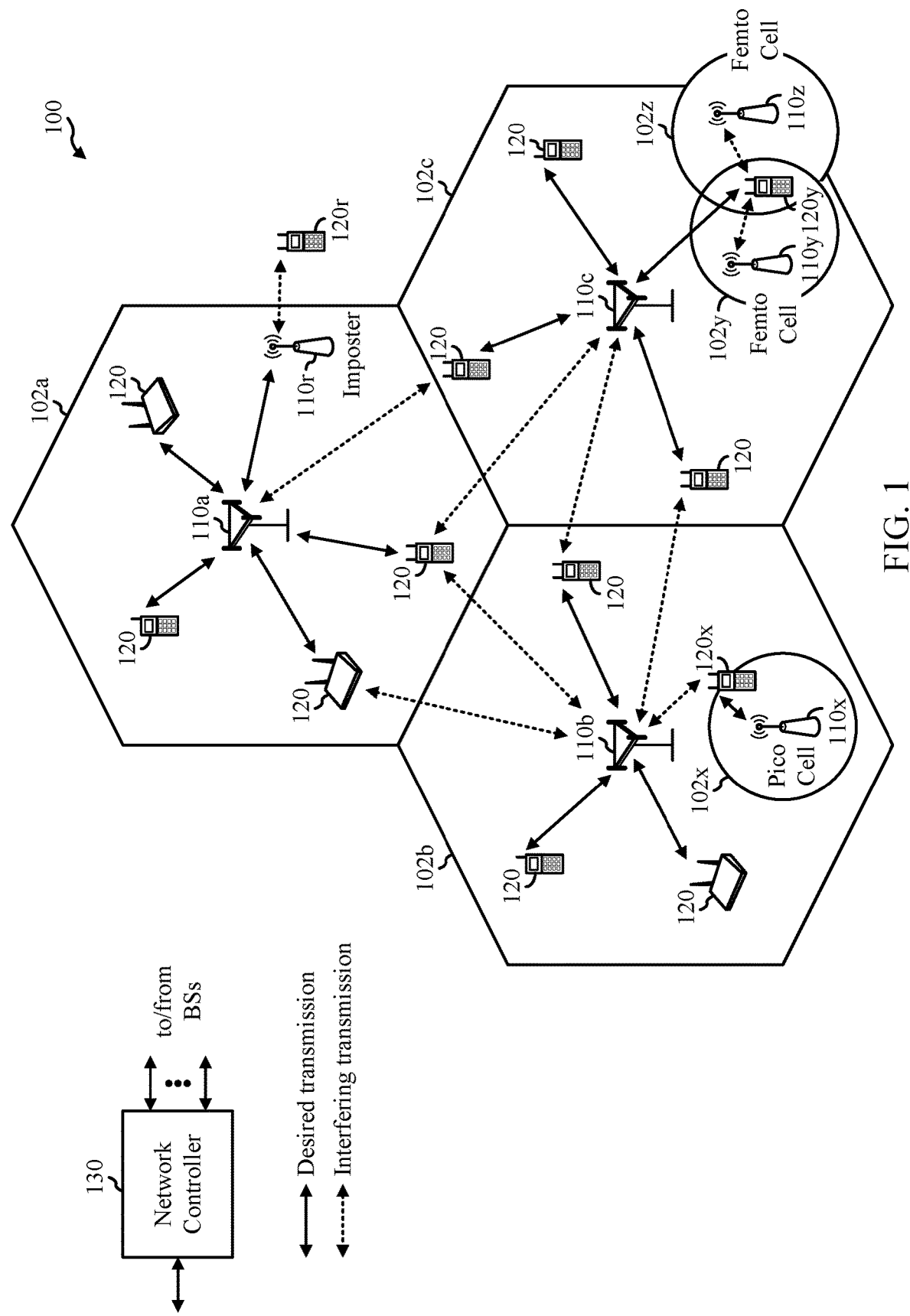
FIG. 1 is a block diagram conceptually illustrating an example telecommunications system, in accordance with certain aspects of the present disclosure.

Aspects of the present disclosure provide apparatus, methods, processing systems, and computer readable mediums for detecting false base station and false base station transmissions.

Certain aspects of the present disclosure may be applied to new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 have nodes (e.g., UE 120, BS 110) that may perform operations and procedures to detect false base stations and transmission therefrom (e.g., as described below in FIGS. 4-5 and 10-11).

As illustrated in FIG. 1, the wireless network 100 may include a number of BSs 110 and other network entities. ABS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include imposter base station (also referred herein as false base station). As used herein, a false base station refers to a base station that receives or detects a transmission of data and/or other information from an upstream station (e.g., a BS or a UE) and sends a transmission of the data and/or other information to a downstream station (e.g., a UE or a BS) posing as BS 110a of wireless network 100.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
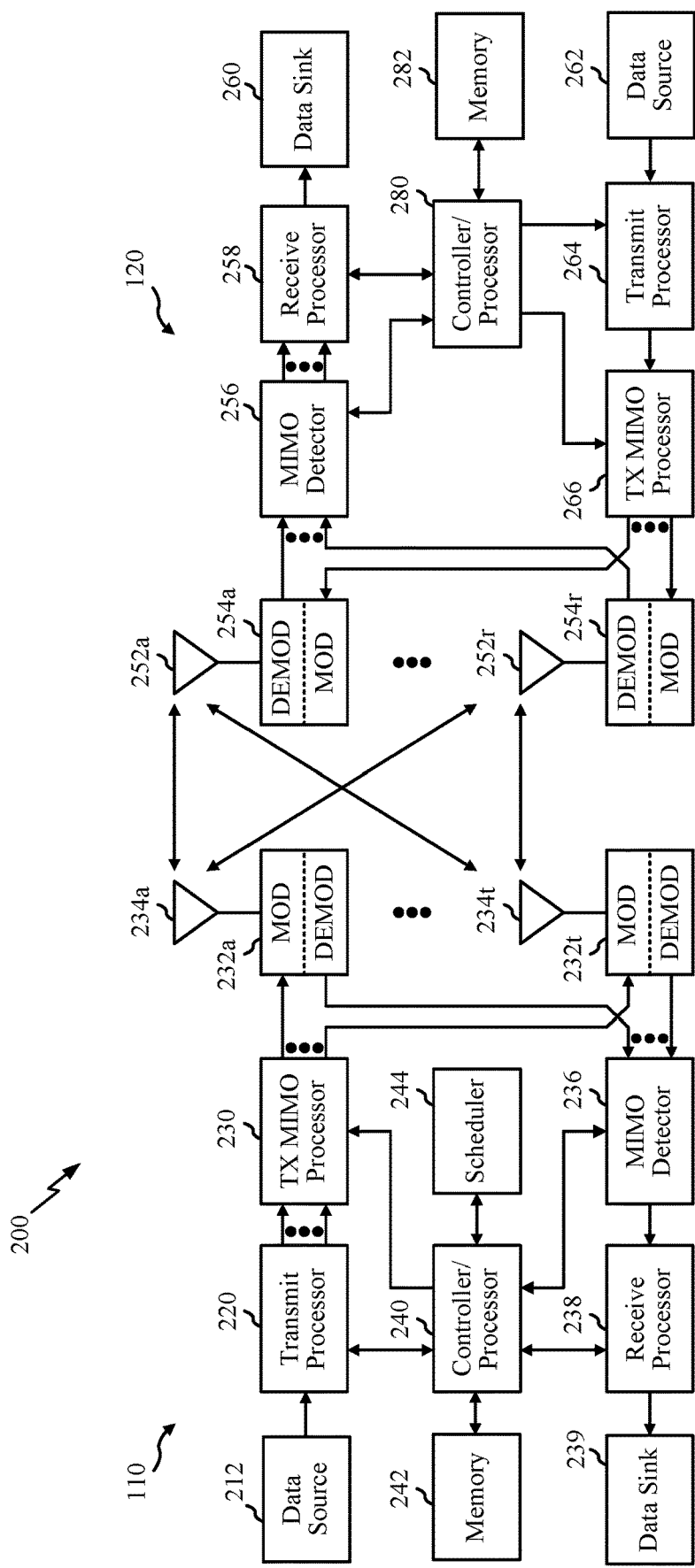
FIG. 2 is a block diagram conceptually illustrating a design of an example BS and user equipment (UE), in accordance with certain aspects of the present disclosure.

FIG. 2 illustrates example components of the BS 110 and UE 120 illustrated in FIG. 1, which may be used to implement aspects of the present disclosure. The BS may include a TRP. One or more components of the BS 110 and UE 120 may be used to practice aspects of the present disclosure. For example, antennas 252, Tx/Rx 254, processors 266, 258, 264, and/or controller/processor 280 of the UE 120 and/or antennas 234, processors 220, 230, 238, and/or controller/processor 240 of the BS 110 may be used to perform the operations described herein and illustrated with reference to FIGS. 5-6 and 10-11.

FIG. 2 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the Physical Uplink Shared Channel (PUSCH)) from a data source 262 and control information (e.g., for the Physical Uplink Control Channel (PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct, e.g., the execution of the functional blocks illustrated in various figures, and/or other processes for the techniques described herein. The processor 280 and/or other processors and modules at the UE 120 may also perform or direct, e.g., the execution of the corresponding/complementary processes for the techniques described herein and as illustrated in various figures. The memories 242 and 282 may store data and program codes for the BS 110 and the UE 120, respectively. A scheduler 244 may schedule UEs for data transmission on the downlink and/or uplink.

Figure 3:
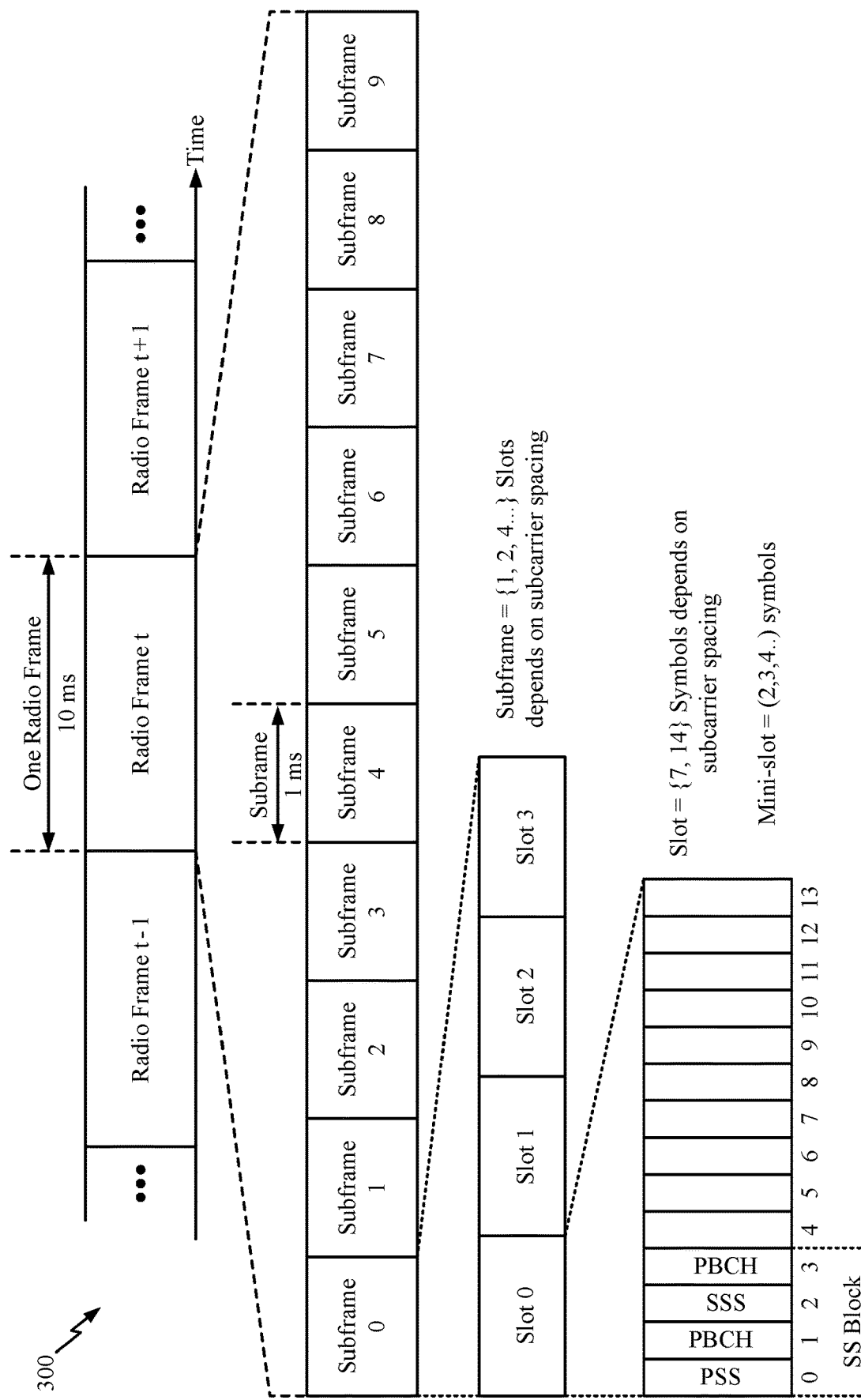
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. In some cases, these signals are examples of the types of signals that a false BS might fake in order to pose as a legitimate BS. The false BS may also fake other types of downlink transmissions (e.g., PDCCH, PDSCH) when posing as a legitimate BS.

The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example False Base Station Detection

Certain aspects of the present disclosure are generally directed to procedures for detecting false BSs and false BS transmissions. As described above, a false BS (e.g., Imposter 110r in FIG. 1) is a base station that may eavesdrop on a legitimate BS (e.g., BS 110 in FIG. 1), mimic (pose) as the legitimate BS to a UE (e.g., UE 120 in FIG. 1) and alter the transmission from the legitimate BS.

Figure 4:
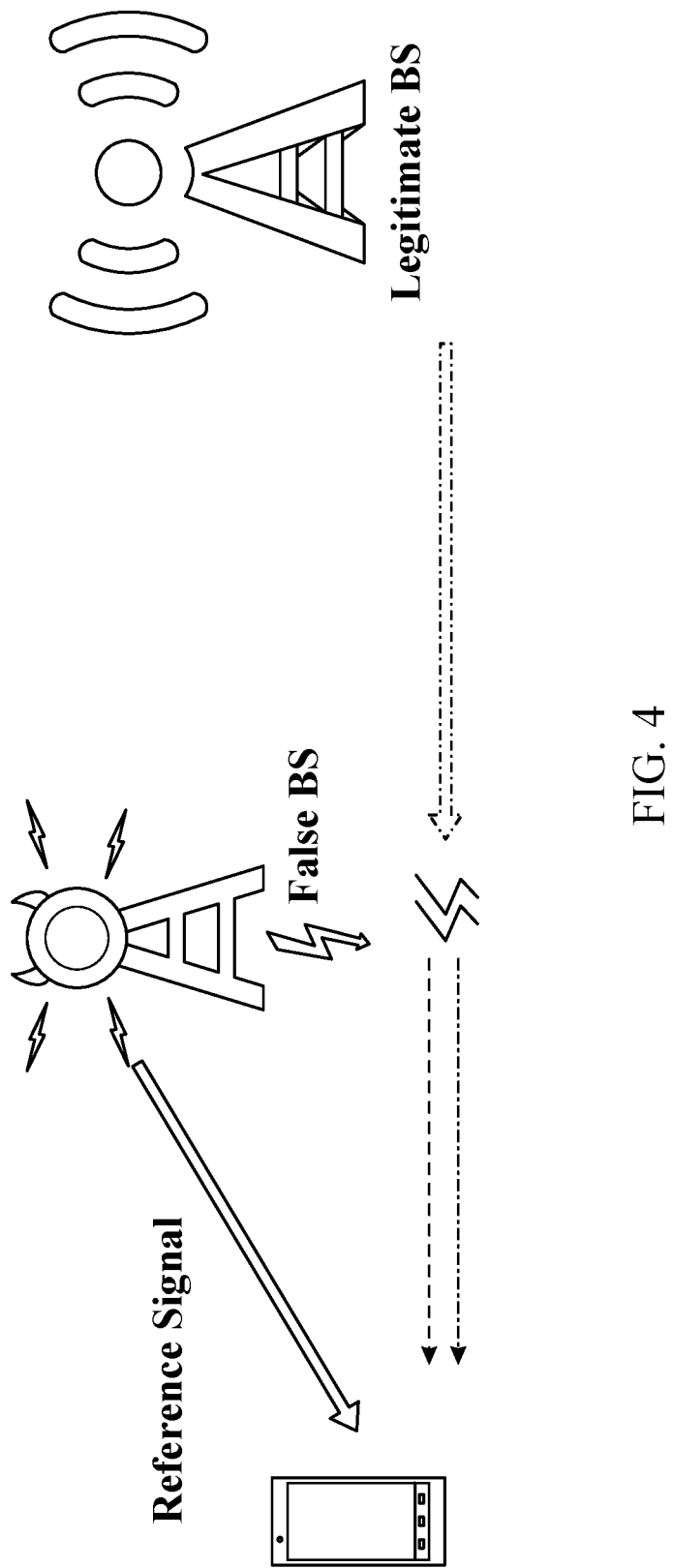
FIG. 4 illustrates an example false (imposter) base station.

As illustrated in FIG. 4, when posing as a legitimate BS to the UE, the false BS may send downlink transmissions (e.g., reference signals and/or channels and/or downlink messages) to the UE that may fool the UE into thinking the downlink transmissions are from the legitimate BS. In this manner, the false BS may attack the UE at a physical layer, and can potentially dupe application layer software.

In certain aspects, the false BS broadcasts transmission signals (e.g., synchronization signals (SSBs)) to make UE to camp on it. In certain aspects, the false BS may transmit signals and/or channels and/or messages that are not transmitted by the legitimate BS. The false BS may modify the content of signals and/or channels and/or messages that are transmitted by the legitimate BS. The false BS may also selectively drop important signals and/or channels and/or messages (e.g., page) that are transmitted by the legitimate BS.

In some cases, the false BS may intercept (e.g., eavesdrop on) the signals and/or channels from the legitimate BS. When the false BS intercepts signals and/or channels from the legitimate BS, the false BS may extract information from these signals and/or channels. With the extracted information, the false BS may generate and broadcast a reference signal to the UE to lure a UE to camp on the false BS. Once the UE synchronizes with the BS, the UE may send other signals, channels and messages that would normally be transmitted by the legitimate BS using the extracted information. Accordingly, the false BS may dupe the UE into sending signals and/or channels to the false BS.

The techniques disclosed herein help detect false base stations and transmissions therefrom, which may prevent attacks to the UE.

Figure 5:
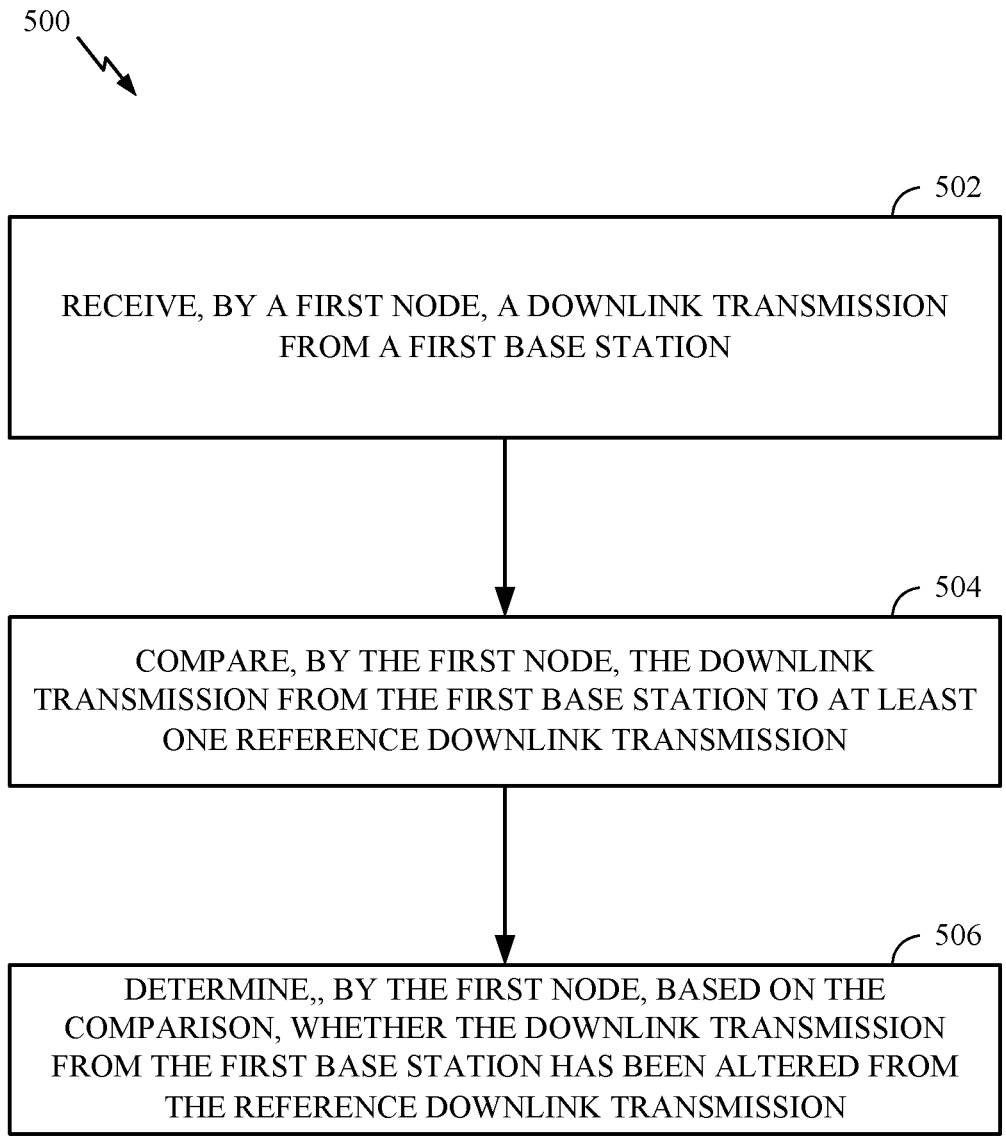
FIG. 5 illustrates example operations for wireless communication by a node, in accordance with certain aspects of the present disclosure.

FIG. 5 illustrates example operations 500 that may be performed by a node as part of a false BS detection procedure, in accordance with certain aspects of the present disclosure. Operations 500 may be performed, for example, by a node, such as a UE 120 shown in FIG. 1 (or one or more of the processors thereof shown in FIG. 2) or a BS 110 shown in FIG. 1. As described above, the signals and/or channels transmitted and received by the UE, the legitimate BS, and the false BS may include messages to be decoded.

Operations 500 begin, at 502, by receiving a downlink transmission from a first base station. At 504, the node compares the downlink transmission from the first base station to at least one reference downlink transmission.

In some cases, the node may be in an area where it is able to hear different legitimate base stations at different times. In such cases, the node may compare the downlink transmission from the first base station to a set of reference signals, each associated with one of a set of candidate legitimate base stations.

At 506, the node determines, based on the comparison, whether the downlink transmission from the first base station has been altered from the reference downlink transmission. Altering may refer to the case that the downlink transmission from the first base station has a stronger power than the reference downlink transmission.

Figure 6:
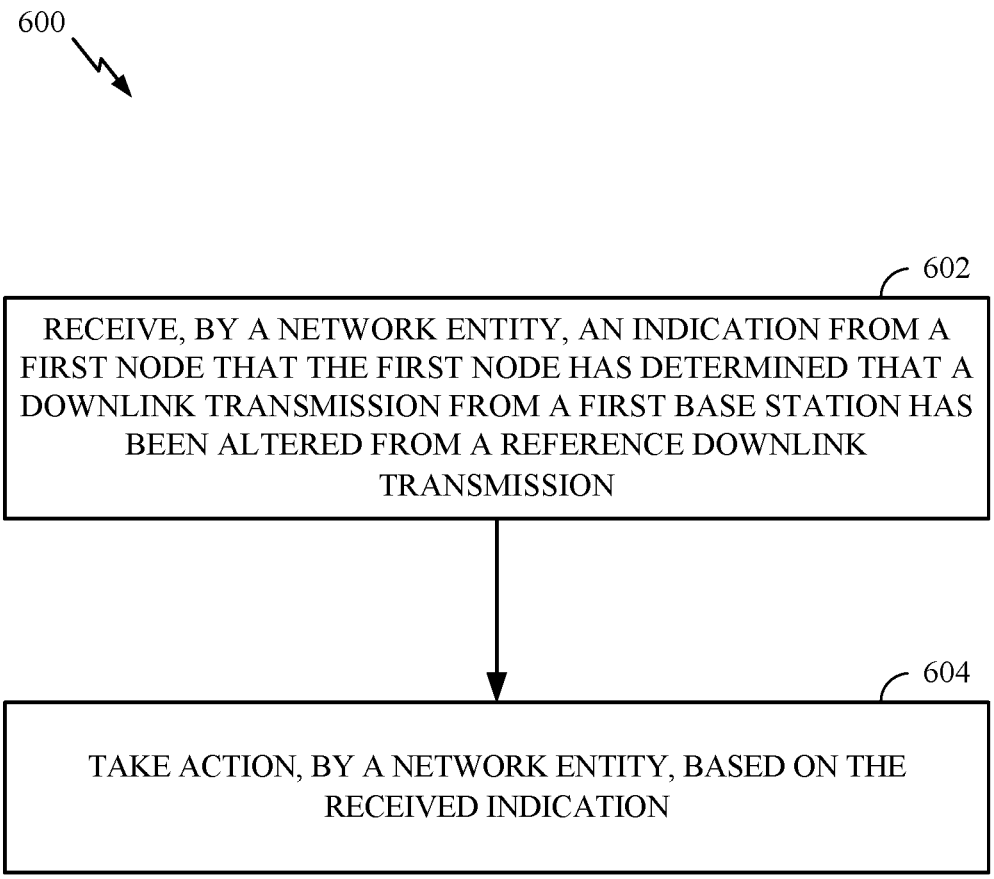
FIG. 6 illustrates example operations for wireless communication by a network entity, in accordance with certain aspects of the present disclosure.

FIG. 6 illustrates example operations 600 that may be performed by a network entity as part of a procedure for detecting false BS transmissions, in accordance with certain aspects of the present disclosure. Operations 600 may be performed by a BS such as the BS 110 (or one or more of the processors thereof shown in FIG. 2) with a UE or another BS 110 performing operations 500 described above.

Operations 600 begin, at 602, by receiving an indication from a first node that the first node has determined that a downlink transmission from a first base station has been altered from a reference downlink transmission. At 604, the network entity takes action based on the received indication.

Depending on the particular implementation, the node that performs operations 500 for detecting a false BS may be a legitimate BS or a special UE (or other type of node) deployed for the detecting a false BS.

For example, a full duplex BS may detect transmissions from the false BS. As illustrated in FIG. 7A, because a full duplex BS may simultaneously (e.g., in same time duration) transmit on the downlink and receive on the uplink, on the same frequency resources. Therefore, a full duplex BS may detect that a false BS is transmitting on the same frequency and at the same time as the full duplex BS is transmitting. By self-interference cancellation, a full duplex base station may be able to receive its downlink transmission at a power level close to the noise floor. If the full duplex BS detects signals and/or channels that are being transmitted by itself at a power level above the noise floor by a threshold, it may claim the signals and/or channels are transmitted by a false BS. In contrast, as shown in FIGS. 7B and 7C, a frequency division duplexing (FDD) BS or a half-duplex BS may not be able to detect a false BS in this manner.

In some cases, the radio frequency (RF) circuit of the full duplex BS may include components designed to isolate transmission components and reception components, in order to avoid cross-talk. Therefore, the BS may be able to receive or detect signals and/or channels transmitted by a false BS at the same time it is transmitting without interference caused by its own signals and/or channels. In some cases, to avoid environmental factors such as reflection and refraction, the BS may include an antenna setup designed to prevent backflow of power transmitted from the transmitter into its own receiver.

In order to detect a false BS, a legitimate BS may check whether a false base station is transmitting signals and/or channels (e.g., synchronization signal block (SSB), physical downlink control channel (PDCCH)) that appear to be from the legitimate BS. For example, the legitimate BS may detect a false BS if it detects that a false BS is transmitting signals and/or channels at the same time the legitimate BS is transmitting.

Figure 8A:
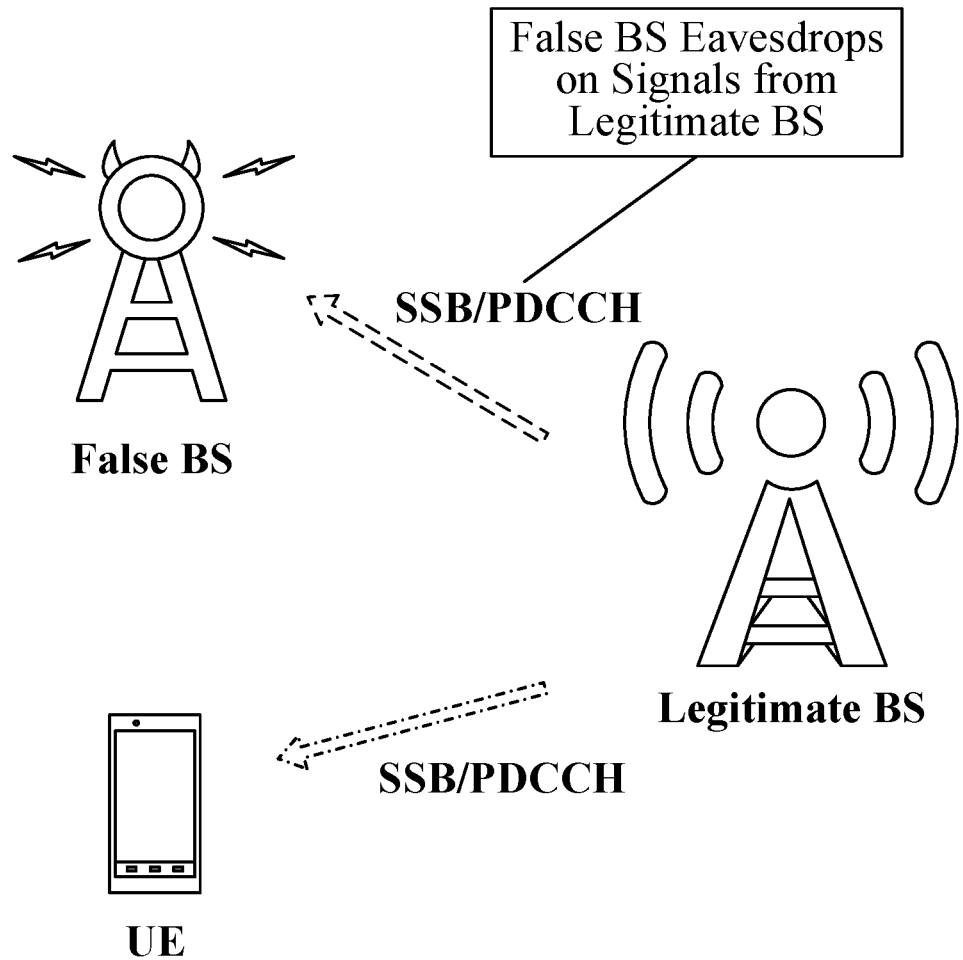
FIGS. 8A-8B conceptually illustrate transmission signals between a legitimate BS, a false BS, and a UE, in accordance with certain aspects of the present disclosure.
Figure 8B:
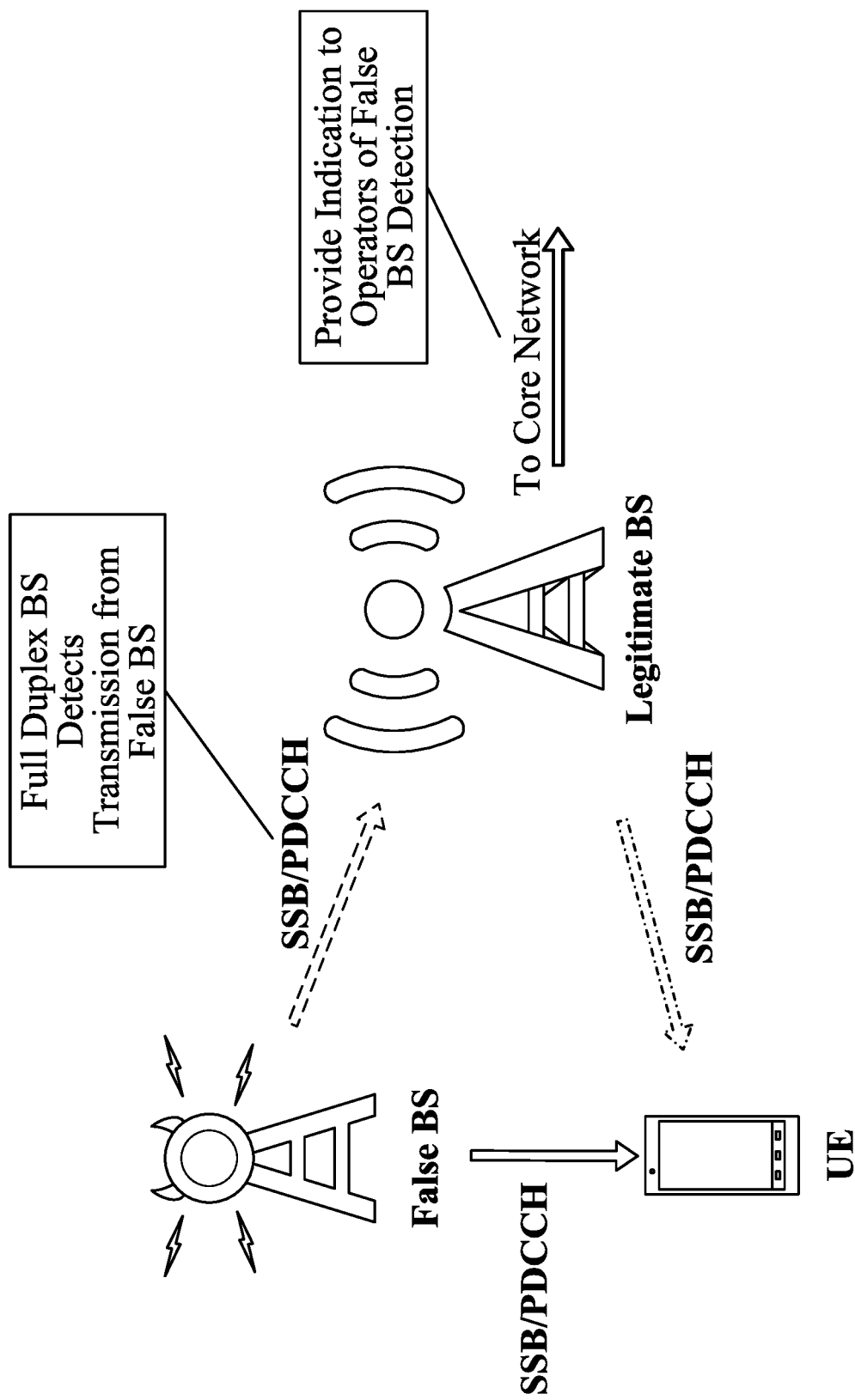

FIGS. 8A-8B illustrate a legitimate BS detecting a false BS, in accordance with certain aspects of the present disclosure. In FIG. 8A, the legitimate sends downlink transmissions (e.g., SSB and/or PDCCH). As illustrated, the false BS, at this time, may be listening in (eavesdropping) on the transmissions from the legitimate BS.

This listening may allow the false BS to extract sufficient information to generate its own downlink transmissions that appear to be from the legitimate BS. For example, the false BS may determine time and frequency resources used for transmitting SSBs. The false BS may also determine the cell ID (based on the primary synchronization signal (PSS) and secondary synchronization signal (SSS)) and/or IDs assigned to the UE (e.g., a cell specific radio network temporary identifier (C-RNTI) and/or other information specific associated with the cell of the legitimate BS.

As shown in FIG. 8B, the false BS may start transmitting signals and/or channels to the UEs (possibly at the same time the legitimate BS is sending its own downlink transmissions). As illustrated, however, the full duplex legitimate BS may detect the downlink transmissions from the false BS. Upon detection, the legitimate BS takes one or more actions. For example, the legitimate BS may provide an indication of the false BS detection to network operators to investigate.

How a legitimate BS detects a false BS based on the monitored transmissions may vary. In some cases, the legitimate BS may determine a false BS if it receives the same SSBs that it is transmitting (itself), but at a power level much higher than a normal value. In other cases, the BS may detect that a false BS is transmitting a downlink channel (e.g., a PDCCH) scrambled by the RNTI specific to the legitimate cell, or to one UE or a group of UEs in the cell.

In some cases, the legitimate BS with full duplex capability may detect the false BS over its own DL frequency bandwidth in a certain time window of certain slots. In some cases, the configuration of the time window may include the time window containing the entire slot. In other cases, the time window may only contain symbols for downlink transmission of the slot, potentially with some margin to account for propagation delay.

In some cases, if a false BS transmits, it may transmit in one or more downlink symbols of a slot configured by the legitimate BS in order to mimic the behavior (e.g., the signals and/or channels) of the legitimate BS.

In some cases, detection of the false BS may be based on the detection of a cell specific or UE specific signal and/or channel transmitted by the false BS, such as an SSB that carries the same cell ID as the legitimate BS. As another example, a cell-specific channel transmitted by the false BS may be a PDCCH, for broadcast information (e.g., PDCCH for system information block (SIB)) and/or a corresponding physical downlink shared channel (PDSCH) (e.g., SIB). In some cases, a UE specific signal transmitted by the false BS may include a UE specific channel, such as a PDCCH scrambled by C-RNTI of a UE and/or corresponding PDSCH.

As described above, in some cases, rather than the legitimate BS, other nodes, such as other BSs and UEs (e.g. a special UE), may detect a false BS. For example, special UEs may be deployed to passively listen to the system for security purposes, such as for detecting false BSs. Such special UEs may always operate in a connected mode. In some aspects, the special UEs may be stationary or mobile (such as drones that roam in the network). Stationary UEs may be distributed over the entire footprint of the network, while mobile UEs (e.g., drones) may roam in the network.

Figure 9:
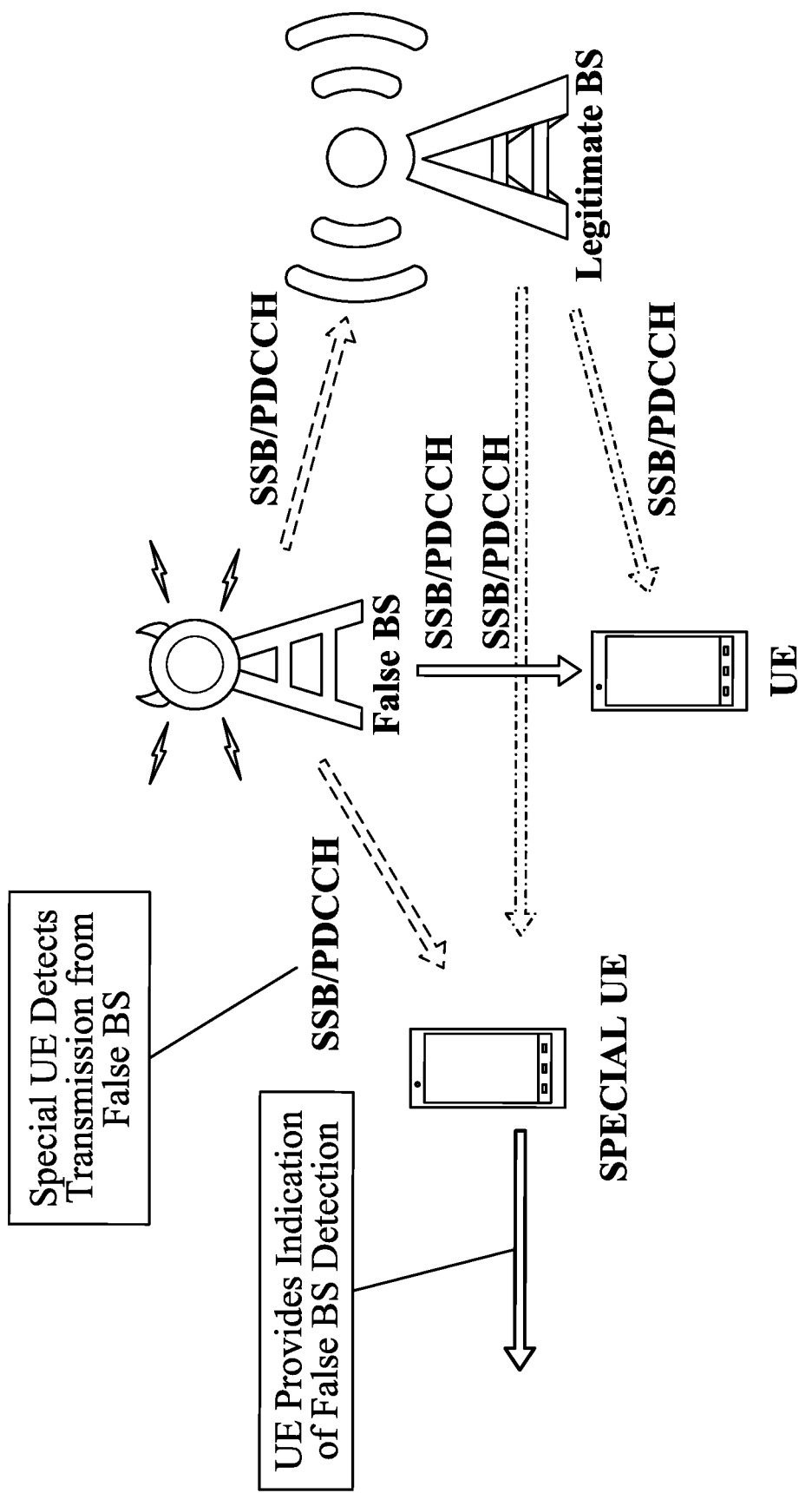
FIG. 9 conceptually illustrates transmission signals between a legitimate BS, a false BS, and a UE, in accordance with certain aspects of the present disclosure.

FIG. 9 illustrates an example of a special UE detects transmissions from the false BS. As illustrated, the special UE detects downlink transmissions (e.g., SSB and/or PDCCH) from a false BS. In some cases, the special UE may determine the transmissions are from a false BS by comparing the downlink transmissions to downlink transmissions associated with the legitimate BS. Upon detecting a false BS, the special UE may provide an indication of the detection. In some cases, the special UE may provide the indication to the legitimate BS (or some other BS if it is not served by the legitimate BS).

As noted above, rather than a special UE, another type of node may be deployed to detect a false BS, such as another base station. In such cases, a base station detecting a false BS (impersonating another UE) may provide an indication of a false BS to a network entity.

As described above, a network entity (BS or other) may receive the indication from the special UE or from the BS that it has determined that one of the signals and/or channels it received has been altered. For example, the indication may include information that the UE or the BS has determined that it has received a SSB or PDCCH that has been altered as compared to a SSB or PDCCH from a legitimate BS. Based on the received indication, the network entity takes action, such as alerting network operators so they may investigate (and/or take appropriate action to disable the false BS).

In some cases, rather than actually detect a false BS itself, a node may generate feedback information allowing for false BS detection by the network ("network-based" false BS detection). In other words, in such cases, the network may process the feedback information to detect a false BS and take action as appropriate.

Figure 10:
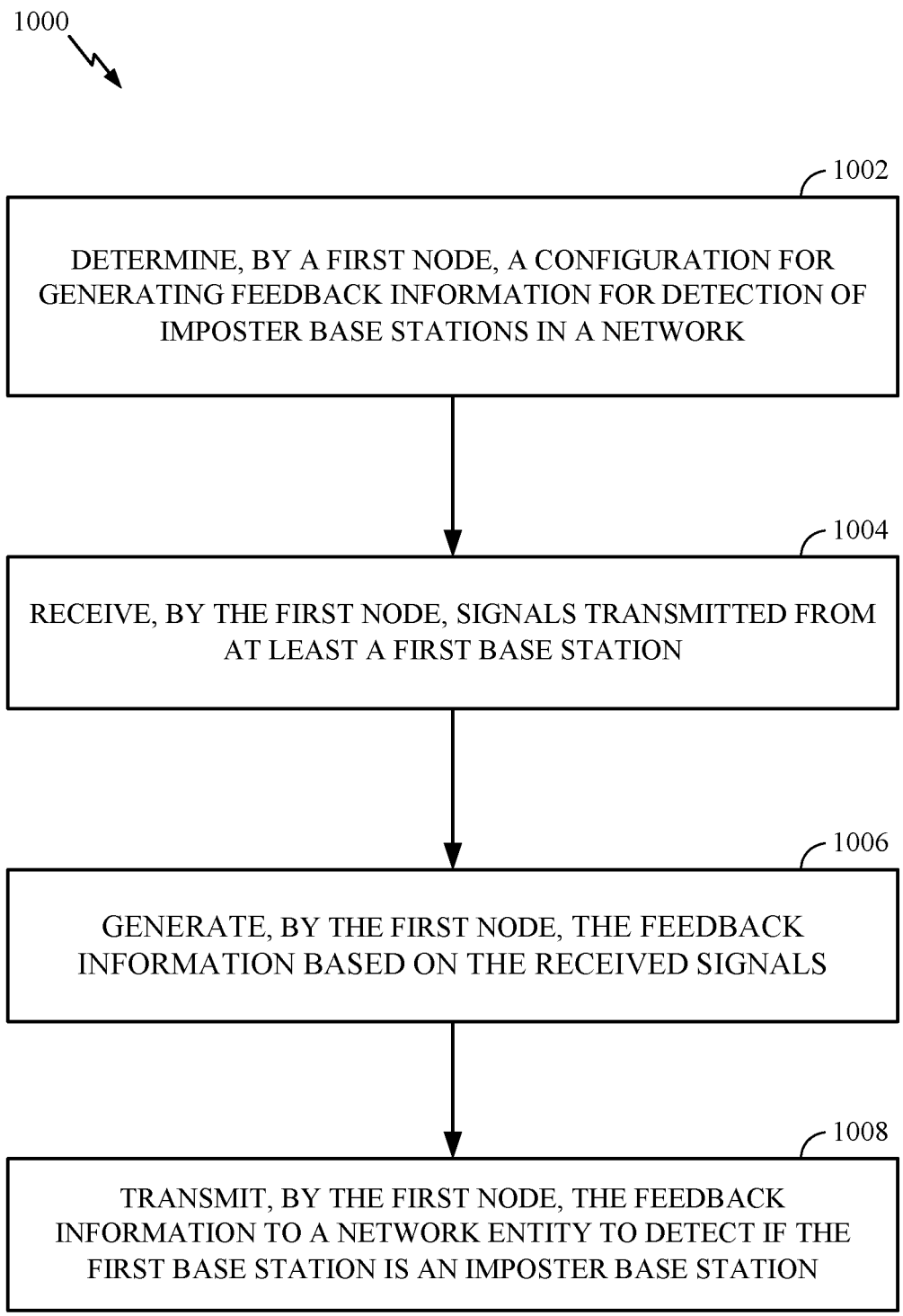
FIG. 10 illustrates example operations for wireless communication by a node, in accordance with certain aspects of the present disclosure.

FIG. 10 illustrates example operations for wireless communication by a node as part of a "network-based" false BS detection procedure, in accordance with certain aspects of the present disclosure. Operations 1000 may be performed, for example, by a node, such as a UE 120 of FIG. 1 (or one or more of the processors thereof shown in FIG. 2) or a legitimate BS 110 of FIG. 1.

Operations 1000 begin, at 1002, by determining a configuration for generating feedback information for detection of imposter base stations in a network. At 1004, the node receives signals and/or channels (downlink transmissions) transmitted from at least a first base station. At 1006, the node generates the feedback information based on the received signals and/or channels. At 1008, the node transmits the feedback information to a network entity to detect if the first base station is an imposter base station.

Figure 11:
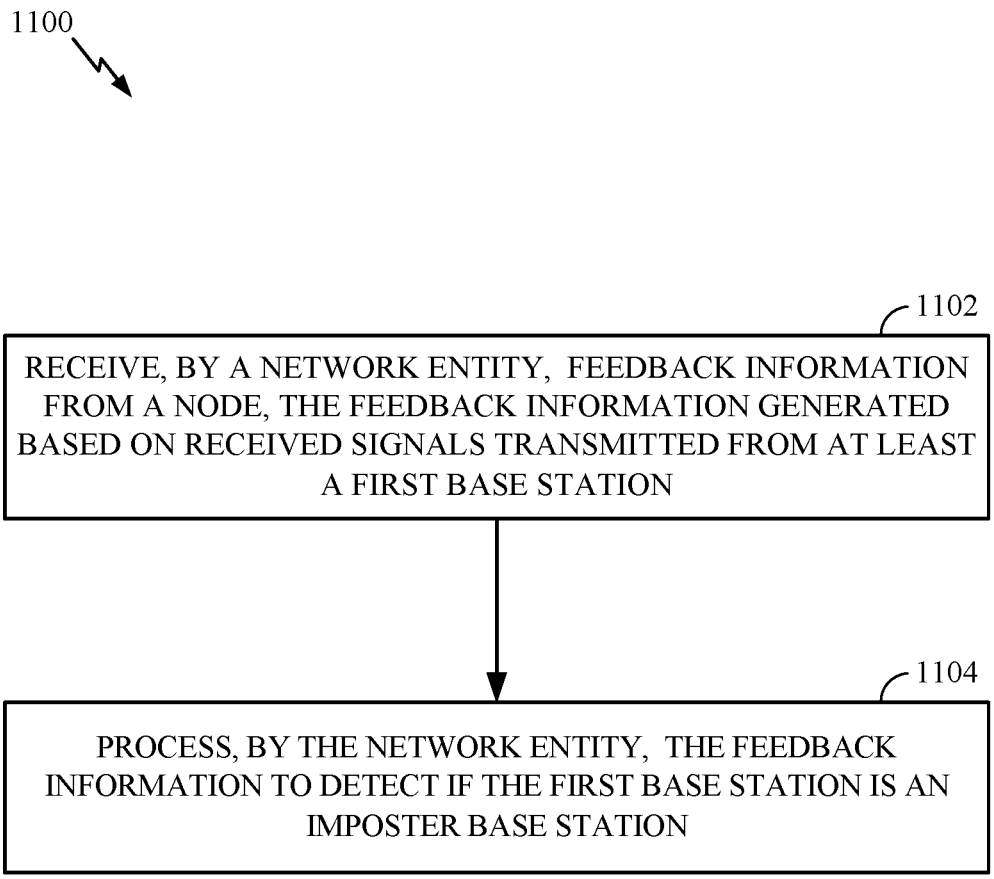
FIG. 11 illustrates example operations for wireless communication by a network entity, in accordance with certain aspects of the present disclosure.

FIG. 11 illustrates example operations 1100 that may be performed by a network entity as part of a false BS detection procedure, in accordance with certain aspects of the present disclosure. Operations 1100 may be performed by a BS such as the BS 110 (or one or more of the processors thereof shown in FIG. 2) with a UE performing operations 1000 described above.

Operations 1100 begin, at 1102, by receiving feedback information from a node, the feedback information generated based on received signals and/or channels transmitted from at least a first base station. At 1104, the network entity processes the feedback information to detect if the first base station is an imposter base station.

As described above, in some cases, a node may report feedback information to the network and let the network determine whether a false BS is present in the network. For example, a special UE or a base station may perform operations 1000 and report feedback information to the network. While FIG. 12 described below shows a special UE reporting feedback information, the operations performed by the special UE may be performed by another type of node, such as another BS.

Figure 12:
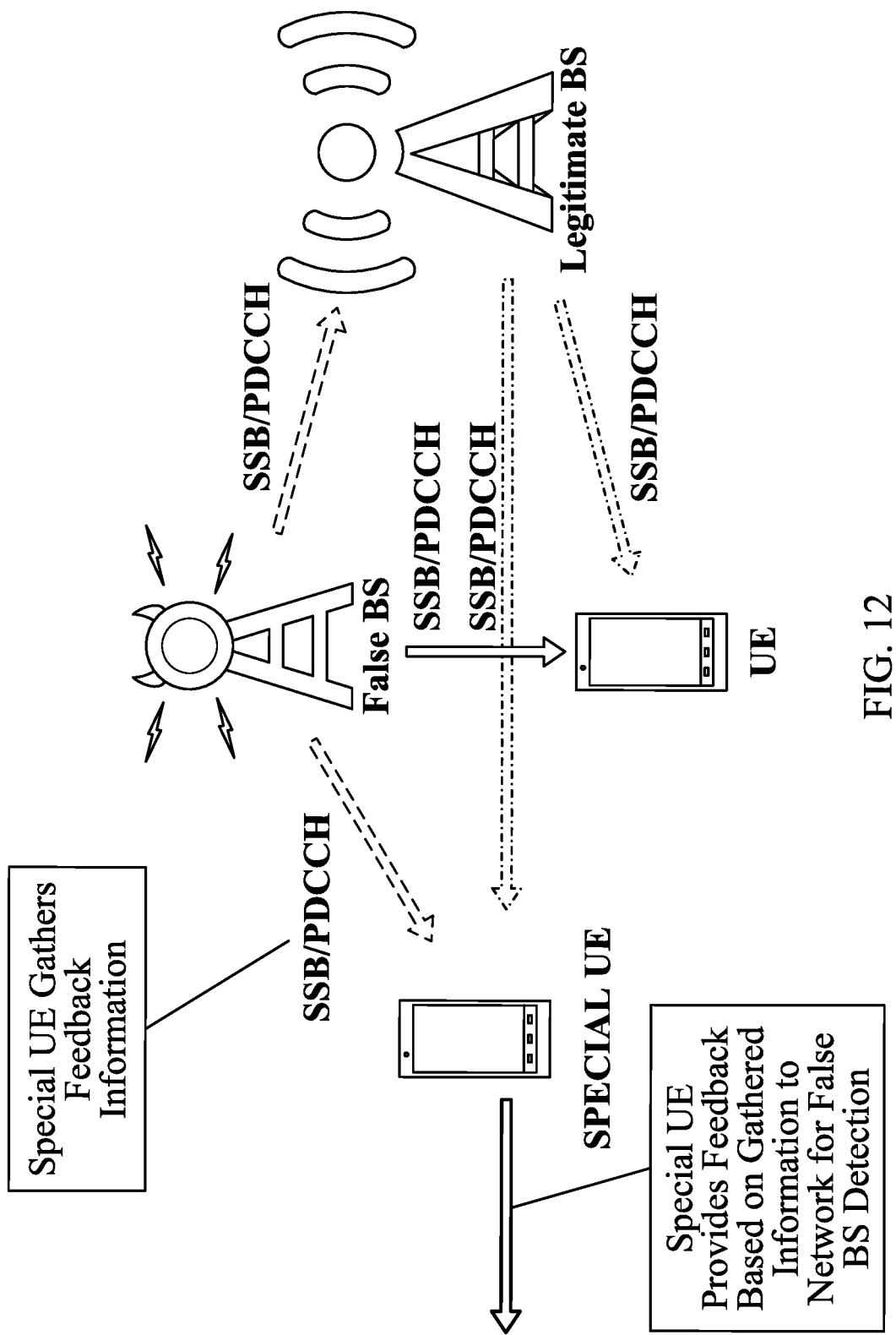
FIG. 12 conceptually illustrates transmission signals between a false BS and a UE, in accordance with certain aspects of the present disclosure.

FIG. 12 illustrates a special UE transmitting feedback information based on signals and/or channels from the false BS. As illustrated, the special UE gathers feedback information based on detection of signals and/or channels (e.g., SSB and/or PDCCH in FIG. 12 but are not limited to SSB and PDCCH) from a false BS. As illustrated, the special UE sends the feedback information (e.g., via the legitimate BS or some other BS serving the special UE). In some cases, the network may receive the feedback information from the node, and process the feedback to determine whether the received signals and/or channels were transmitted from a false BS.

In some cases, the special UE (or other type node) may report, as feedback information, in-phase and quadrature (I-Q) samples of signals and/or channels from a false BS and let the network process the I-Q samples.

In some cases, the special UE (or other type node) reports periodically based on a network configuration. In such cases, the special UE reports the feedback information, such as the number of paging messages (i.e., page count), and/or PDCCH occupancy detected during a corresponding period, based on signals and/or channels from the false BS. Alternatively, the special UE (or other type node) may determine whether the false BS is detected based on the feedback information it has collected and directly report the detection result which at least indicates whether the false BS is detected to network.

In some cases, the special UE (or other type node) uses event-based reporting to report feedback information based on a trigger of expected behavior of the false BS. For example, the UE (or other type node) reports feedback information when the UE (or other type node) detects an abnormal page count or when the UE (or other type node) detects that a page has not been received after a certain period of time. Alternatively, the special UE (or other type node) may determine whether the false BS is detected based on the feedback information it has collected and directly report the detection result which at least indicates whether the false BS is detected to network. In such cases, the actual information fed back may be an indication the node detected a false BS.

Once special UE (or other type node) generates and transmits the feedback information to the network, the network may judge whether feedback information from certain other nodes in the network does not agree with the signals and/or channels transmitted by the legitimate BS.

As noted above, a special UE (or other type node) may be able to receive downlink transmissions from multiple legitimate BSs. In such cases, the node compares the collected downlink information (e.g., information for count of pages, PDDCH occupancy, etc.) with the reference information associated with each of the legitimate BSs. If the collected downlink information does not agree with reference information associated with any legitimate BS, the node reports to network that a false BS is detected (and possibly which BS is being impersonated). Alternatively, in such cases, the special UE (or other type node) may report the collected downlink information (e.g. I-Q samples) to network. Network compares the collected downlink information with the reference information associated with each of the legitimate BSs. If the collected downlink information does not agree with reference information associated with any legitimate BS, network claims that a false BS is detected (and possibly which BS is being impersonated).

Figure 13:
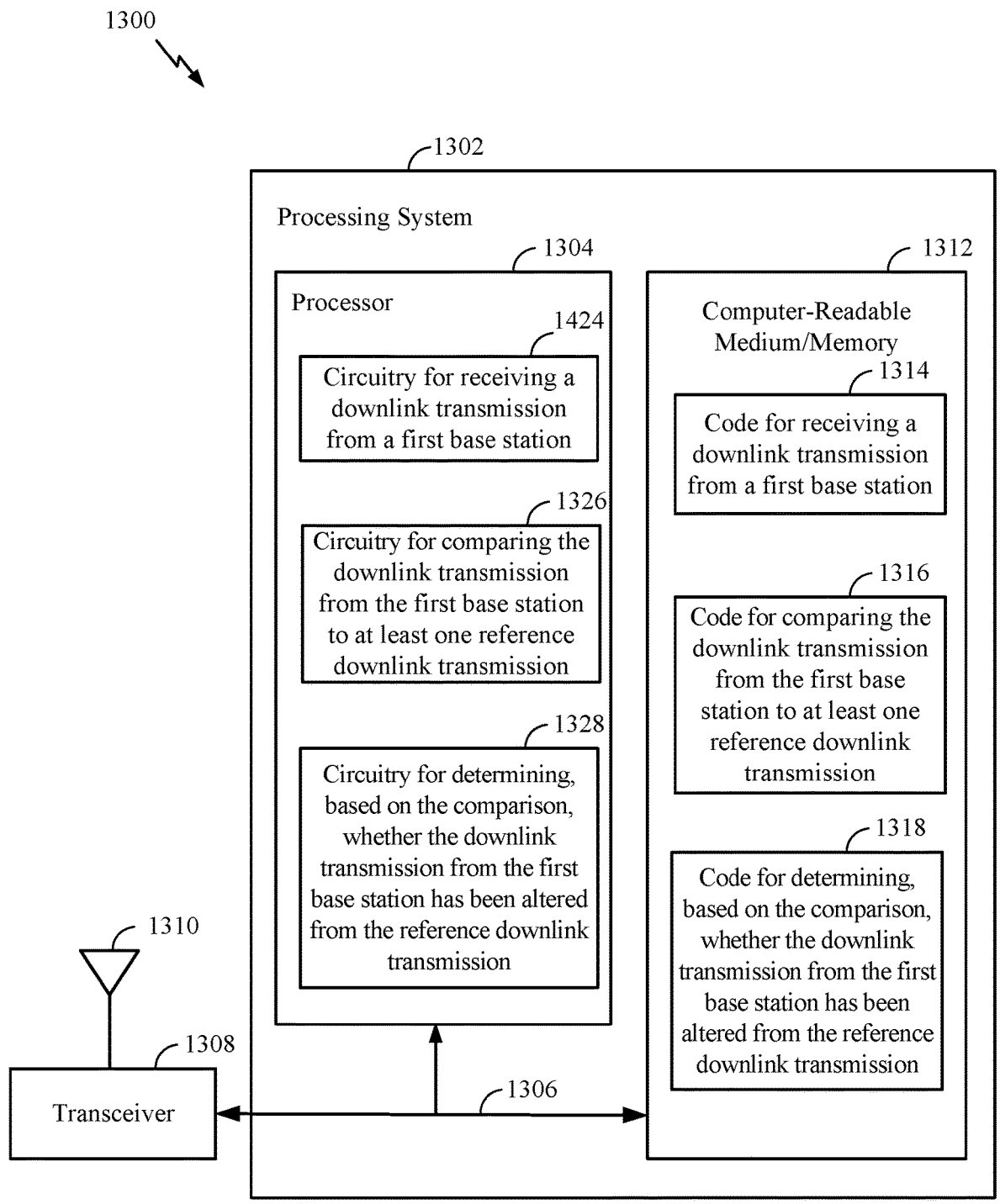
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 5. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 5, or other operations for performing the various techniques discussed herein for false base station detection. In certain aspects, computer-readable medium/memory 1312 stores code 1314 for receiving a downlink transmission from a first base station; code 1316 for comparing the downlink transmission from the first base station to at least one reference downlink transmission; and code 1318 for determining, based on the comparison, whether the downlink transmission from the first base station has been altered from the reference downlink transmission. In certain aspects, the processor 1304 has circuitry configured to implement the code stored in the computer-readable medium/memory 1312. The processor 1304 includes circuitry 1324 for receiving a downlink transmission from a first base station; circuitry 1326 for comparing the downlink transmission from the first base station to at least one reference downlink transmission; and circuitry 1328 for determining, based on the comparison, whether the downlink transmission from the first base station has been altered from the reference downlink transmission.

Figure 14:
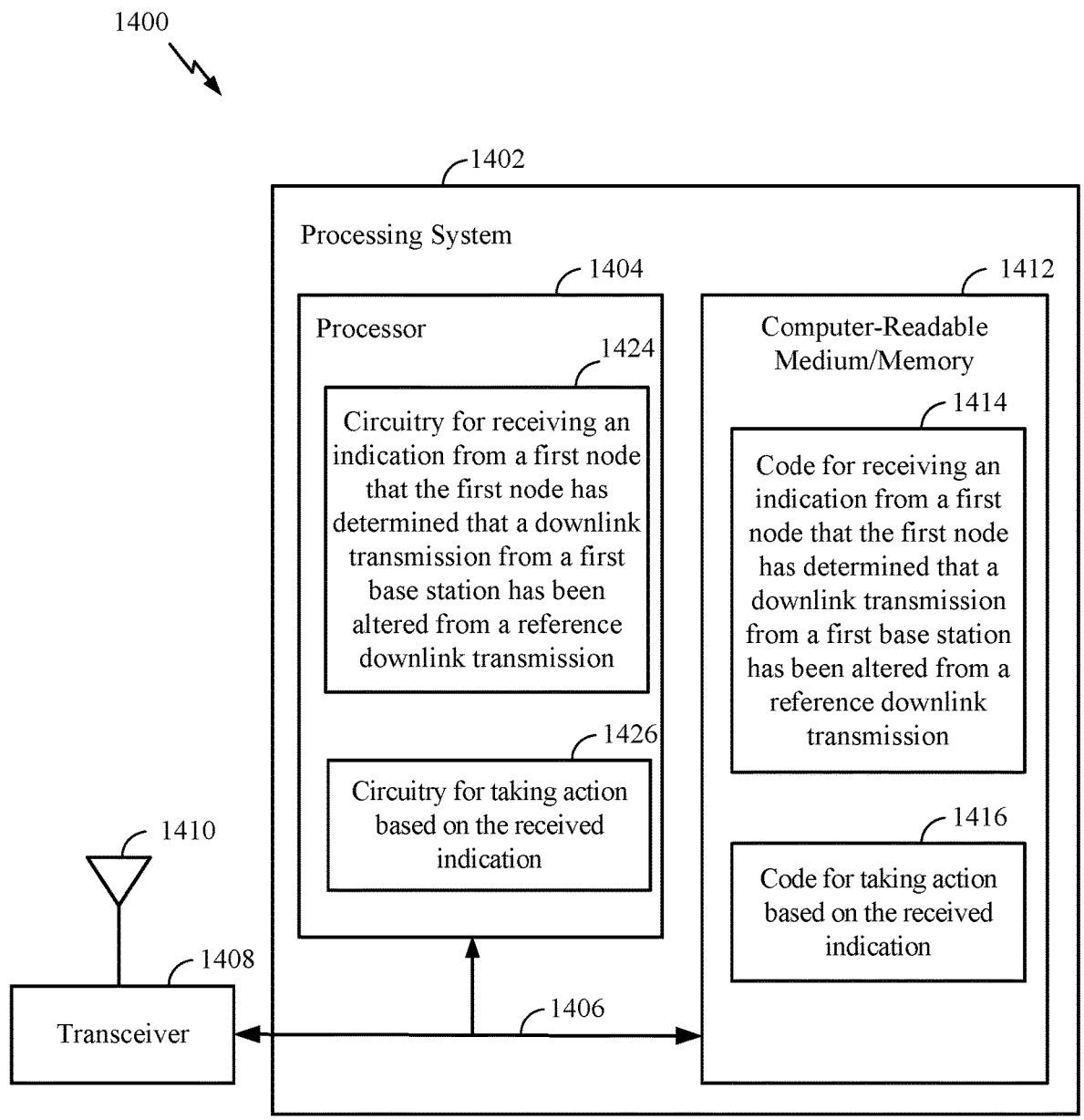
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 6. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 6, or other operations for performing the various techniques discussed herein for false base station detection. In certain aspects, computer-readable medium/memory 1412 stores code 1414 for receiving an indication from a first node that the first node has determined that a downlink transmission from a first base station has been altered from a reference downlink transmission; and code 1416 for taking action based on the received indication. In certain aspects, the processor 1404 has circuitry configured to implement the code stored in the computer-readable medium/memory 1412. The processor 1404 includes circuitry 1424 for receiving an indication from a first node that the first node has determined that a downlink transmission from a first base station has been altered from a reference downlink transmission; and circuitry 1426 for taking action based on the received indication.

Figure 15:
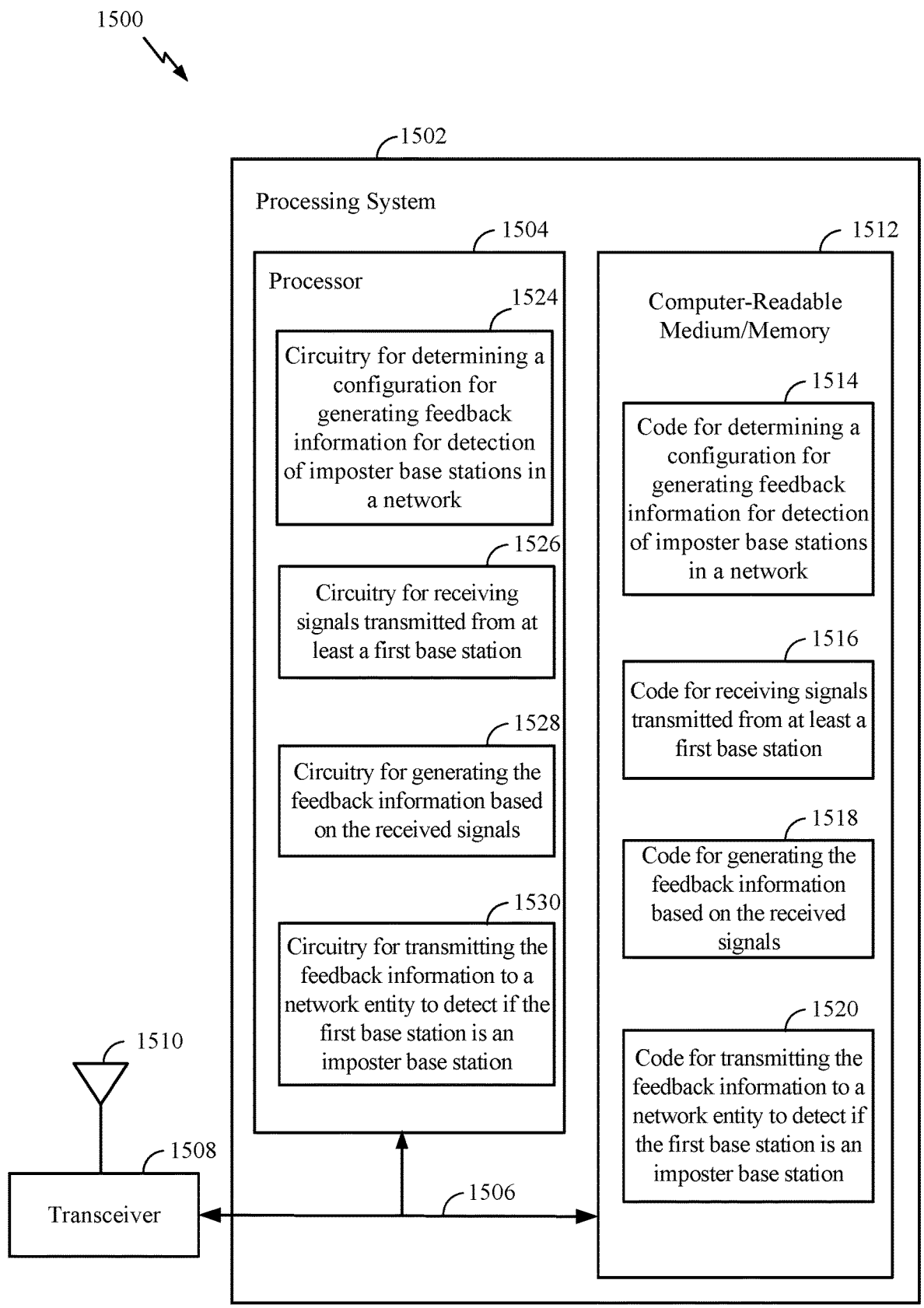
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 10. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 10, or other operations for performing the various techniques discussed herein for false base station detection. In certain aspects, computer-readable medium/memory 1512 stores code 1514 for determining a configuration for generating feedback information for detection of imposter base stations in a network; code 1516 for receiving signals transmitted from at least a first base station; code 1518 for generating the feedback information based on the received signals; and code 1520 for transmitting the feedback information to a network entity to detect if the first base station is an imposter base station. In certain aspects, the processor 1504 has circuitry configured to implement the code stored in the computer-readable medium/memory 1512. The processor 1504 includes circuitry 1524 for determining a configuration for generating feedback information for detection of imposter base stations in a network; circuitry 1526 for receiving signals transmitted from at least a first base station; circuitry 1528 for generating the feedback information based on the received signals; and circuitry 1530 for transmitting the feedback information to a network entity to detect if the first base station is an imposter base station.

Figure 16:
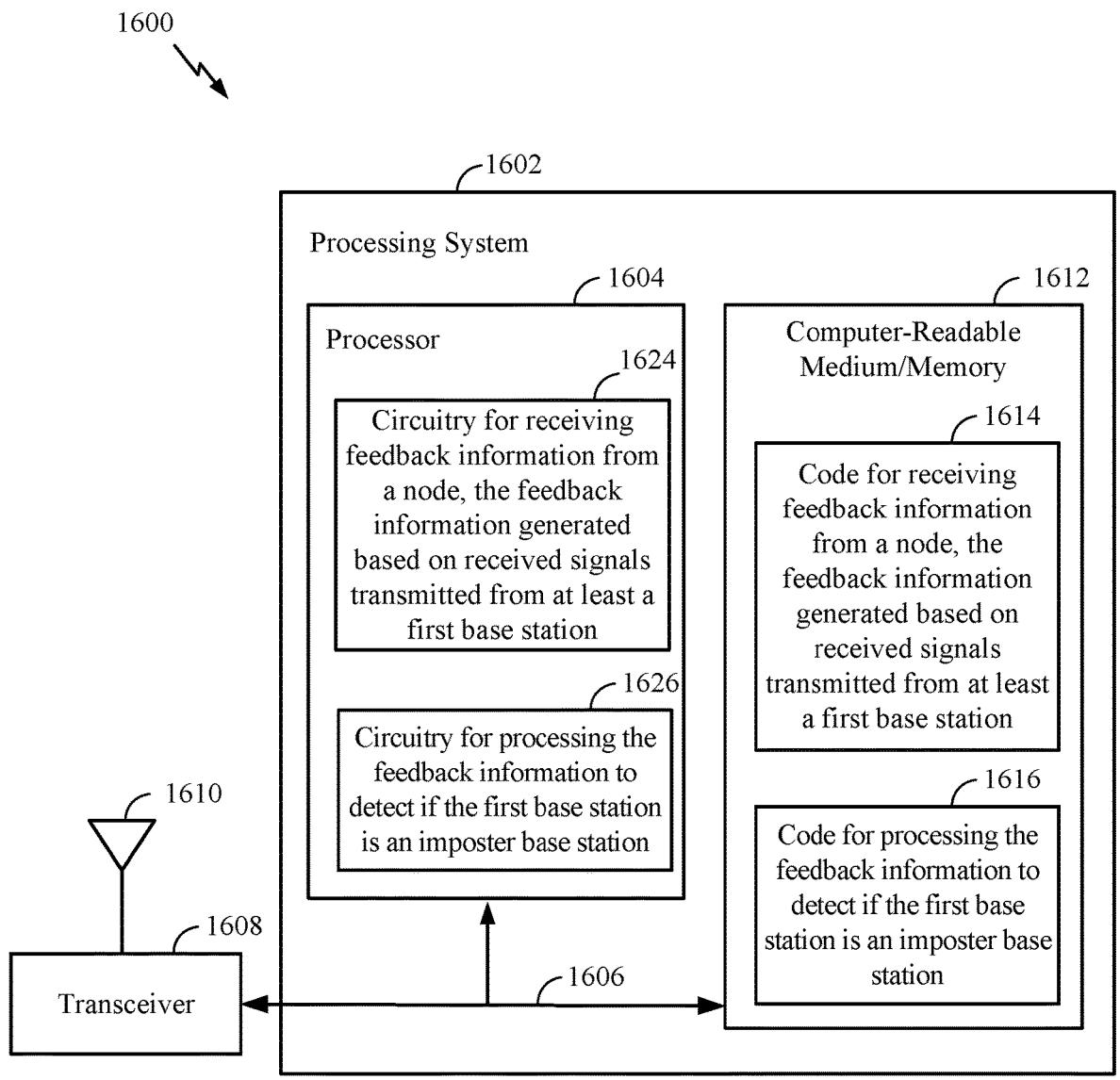
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 11. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 11, or other operations for performing the various techniques discussed herein for false base station detection. In certain aspects, computer-readable medium/memory 1612 stores code 1614 for receiving feedback information from a node, the feedback information generated based on received signals transmitted from at least a first base station; and code 1616 for processing the feedback information to detect if the first base station is an imposter base station. In certain aspects, the processor 1604 has circuitry configured to implement the code stored in the computer-readable medium/memory 1612. The processor 1604 includes circuitry 1624 for receiving feedback information from a node, the feedback information generated based on received signals transmitted from at least a first base station; and circuitry 1626 for processing the feedback information to detect if the first base station is an imposter base station.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 338) or an antenna(s) 334 of the access point 110 or the receive processor 358 or antenna(s) 352 of the station 120 illustrated in FIG. 3. Means for transmitting or means for outputting may include a transmitter (such as the transmit processor 320) or an antenna(s) 334 of the access point 110 or the transmit processor 364 or antenna(s) 352 of the station 120 illustrated in FIG. 3. Means for associating, means for determining, means for monitoring, means for deciding, means for providing, means for detecting, means for performing, and/or means for setting may include a processing system, which may include one or more processors, such as the receive processor 338/358, the transmit processor 320/364, the TX MIMO processor 330/366, or the controller 340/380 of the access point 110 and station 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
at least one processor configured to:
receive a downlink transmission from a first base station;
compare the downlink transmission from the first base station to at least one reference downlink transmission;
determine based on the comparison, whether the downlink transmission from the first base station has been altered from the reference downlink transmission;
detect, based on the determination, that the first base station is an imposter base station posing as a second base station; and
notify a network entity of the detected imposter base station; and
a memory coupled with the at least one processor.

2. The apparatus of claim 1, wherein:
the downlink transmission from the first base station comprises at least one of a cell-specific signal or a user equipment (UE)-specific signal.

3. The apparatus of claim 2, wherein the cell-specific signal comprises at least one of:
a synchronization signal block (SSB) that carries a same cell identifier (ID) as a second base station; or
a physical downlink control channel (PDCCH); or
a physical downlink shared channel (PDSCH) scheduled by the PDCCH.

4. The apparatus of claim 2, wherein the UE-specific signal comprises at least one of:
a physical downlink control channel (PDCCH) scrambled by a UE-specific identifier (ID); or
a physical downlink shared channel (PDSCH) scheduled by the PDCCH.

5. The apparatus of claim 1, wherein:
the apparatus comprises a second base station; and
the second base station is capable of full duplex communication.

6. The apparatus of claim 1, wherein:
the apparatus comprises a user equipment (UE) or a third base station.

7. The apparatus of claim 6, wherein the apparatus comprises a UE that is deployed in a network to passively listen to detect imposter base stations for security purposes;
wherein the UE comprises one of:
a stationary UE; or
a mobile UE designed to roam the network to passively listen to detect imposter base stations in different locations.

8. The apparatus of claim 1, wherein comparing the downlink transmission from the first base station to the at least one reference downlink transmission comprises comparing the downlink transmission to a set of reference downlink transmissions, each associated with one of a set of base stations.

9. A method for wireless communications, comprising:
receiving a downlink transmission from a first base station;
comparing the downlink transmission from the first base station to at least one reference downlink transmission;
determining based on the comparison, whether the downlink transmission from the first base station has been altered from the reference downlink transmission;
detecting, based on the determination, that the first base station is an imposter base station posing as a second base station; and
notifying a network entity of the detected imposter base station.

10. The method of claim 9, wherein:
the downlink transmission from the first base station comprises at least one of a cell-specific signal or a user equipment (UE)-specific signal.

11. The method of claim 10, wherein the cell-specific signal comprises at least one of:
a synchronization signal block (SSB) that carries a same cell identifier (ID) as a second base station; or
a physical downlink control channel (PDCCH); or
a physical downlink shared channel (PDSCH) scheduled by the PDCCH.

12. The method of claim 10, wherein the UE-specific signal comprises at least one of:
a physical downlink control channel (PDCCH) scrambled by a UE-specific identifier (ID); or
a physical downlink shared channel (PDSCH) scheduled by the PDCCH.

13. The method of claim 9, wherein comparing the downlink transmission from the first base station to the at least one reference downlink transmission comprises comparing the downlink transmission to a set of reference downlink transmissions, each associated with one of a set of base stations.

14. An apparatus for wireless communication, comprising:
means for receiving a downlink transmission from a first base station;
means for comparing the downlink transmission from the first base station to at least one reference downlink transmission;
means for determining based on the comparison, whether the downlink transmission from the first base station has been altered from the reference downlink transmission;
means for detecting, based on the determination, that the first base station is an imposter base station posing as a second base station; and
means for notifying a network entity of the detected imposter base station.

15. The apparatus of claim 14, wherein:
the downlink transmission from the first base station comprises at least one of a cell-specific signal or a user equipment (UE)-specific signal.

16. The apparatus of claim 15, wherein the cell-specific signal comprises at least one of:
a synchronization signal block (SSB) that carries a same cell identifier (ID) as a second base station; or
a physical downlink control channel (PDCCH); or
a physical downlink shared channel (PDSCH) scheduled by the PDCCH.

17. The apparatus of claim 15, wherein the UE-specific signal comprises at least one of:
a physical downlink control channel (PDCCH) scrambled by a UE-specific identifier (ID); or
a physical downlink shared channel (PDSCH) scheduled by the PDCCH.

18. The apparatus of claim 14, wherein:
the apparatus comprises a second base station; and
the second base station is capable of full duplex communication.

19. The apparatus of claim 14, wherein:
the apparatus comprises a user equipment (UE) or a third base station.

20. The apparatus of claim 19, wherein the apparatus comprises a UE that is deployed in a network to passively listen to detect imposter base stations for security purposes;
wherein the UE comprises one of:
a stationary UE; or
a mobile UE designed to roam the network to passively listen to detect imposter base stations in different locations.

21. The apparatus of claim 14, wherein the means for comparing the downlink transmission from the first base station to the at least one reference downlink transmission comprises means for comparing the downlink transmission to a set of reference downlink transmissions, each associated with one of a set of base stations.

22. A non-transitory computer-readable medium having instructions stored thereon for:
receiving a downlink transmission from a first base station;
comparing the downlink transmission from the first base station to at least one reference downlink transmission;
determining based on the comparison, whether the downlink transmission from the first base station has been altered from the reference downlink transmissions;
detecting, based on the determination, that the first base station is an imposter base station posing as a second base station; and notifying a network entity of the detected imposter base station.

23. The non-transitory computer-readable medium of claim 22, wherein:
the downlink transmission from the first base station comprises at least one of a cell-specific signal or a user equipment (UE)-specific signal.

24. The non-transitory computer-readable medium of claim 23, wherein the cell-specific signal comprises at least one of:
a synchronization signal block (SSB) that carries a same cell identifier (ID) as a second base station; or
a physical downlink control channel (PDCCH); or
a physical downlink shared channel (PDSCH) scheduled by the PDCCH.

25. The non-transitory computer-readable medium of claim 23, wherein the UE-specific signal comprises at least one of:
a physical downlink control channel (PDCCH) scrambled by a UE-specific identifier (ID); or
a physical downlink shared channel (PDSCH) scheduled by the PDCCH.

26. The non-transitory computer-readable medium of claim 22, wherein comparing the downlink transmission from the first base station to the at least one reference downlink transmission comprises comparing the downlink transmission to a set of reference downlink transmissions, each associated with one of a set of base stations.

* * * * *